3,153,609
CHEMICAL RECOVERY PROCESS
Henry P. Markant and Robert F. Dudek, Alliance, Ohio, assignors to The Babcock & Wilcox Company, New York, N.Y., a corporation of New Jersey
Filed Nov. 25, 1960, Ser. No. 71,822
4 Claims. (Cl. 162—36)

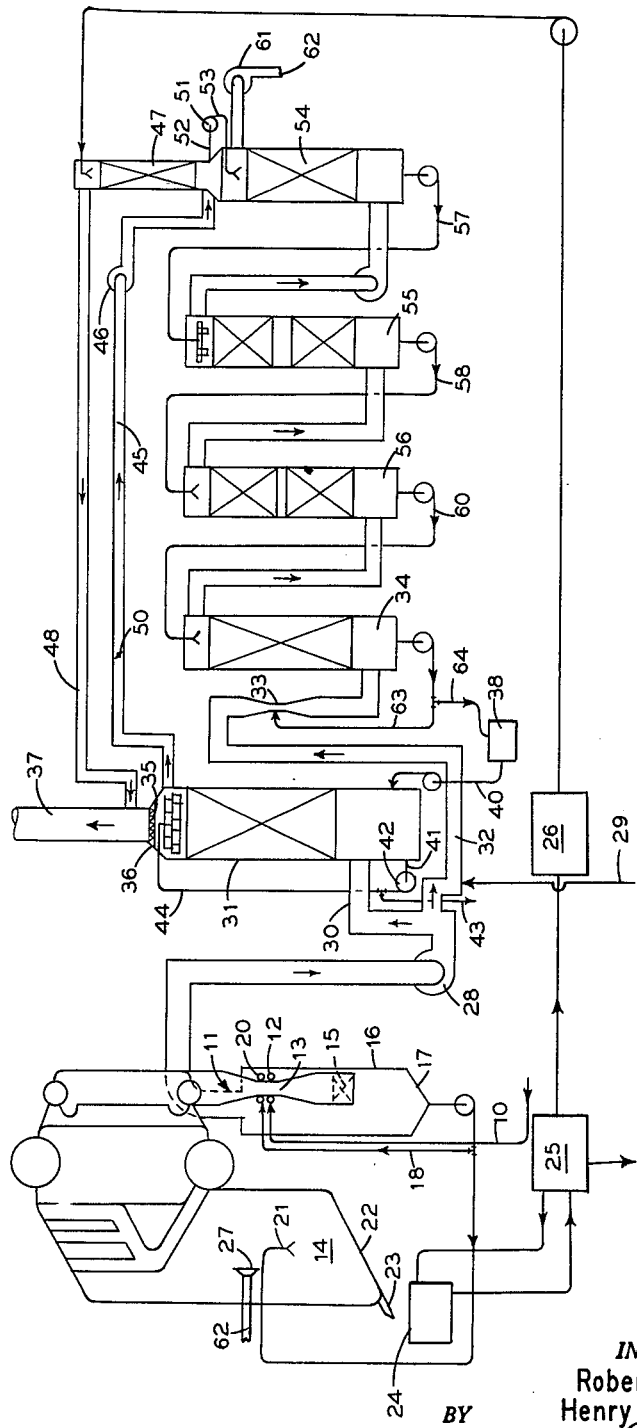

The present invention relates to the recovery of chemicals from the residual liquor of a pulp digesting process utilizing sodium salts of sulphurous acid alone or in combination with other constituents such as sodium carbonates or sulphur dioxides, and more particularly to an improvement in the process disclosed in U.S. Patent 2,788,273.

In the chemical pulping of wood chips or the like, the digestion of the chips is intended to soften or remove the organic constituents which tend to bind the cellulose fibers together. Various sodium-sulphur compounds may be used as cooking agents under suitable temperature and pressure conditions with the pulp thereafter separated from the residual liquor which contains the spent cooking agents and the organic matter removed from the cellulose fibers. The chemicals in the residual liquor may be recovered for re-use in the cooking process with a minimum loss of the chemicals. One such process is disclosed and claimed in U.S. Patent 2,788,273 where concentrated residual liquor is incinerated so that the organic matter in the liquor is burned and the heat therefrom utilized to convert the inorganic chemicals to a molten smelt containing sodium-sulphur compounds. The gaseous products of incineration which contain both carbon dioxide and sulphur dioxide are thereafter reacted with the smelt to produce re-usable cooking agents.

According to said U.S. Patent 2,788,273, the incineration of the residual liquor occurs in a furnace particularly designed and constructed to perform the process. The smelt from the furnace is dissolved or leached in a water solution to form green liquor, with the liquor thereafter passed through carbonation and sulphiting towers to convert the green liquor to a cooking liquor. The carbonation and sulphiting of the green or leached liquor is accomplished by preferential direct contact and reaction with the gases of combustion resulting from the incineration of the residual or spent cooking liquor.

As disclosed in said patent, the flue or combustion gases leaving the incinerating furnace are partially cooled by heat exchange with a vaporizable fluid and utilized to concentrate the residual or spent cooking liquor by evaporation, prior to the delivery of the thus concentrated liquor to the incinerating furnace. The partially cooled flue gases are thereafter passed through a sulphiting tower where the gases are passed in direct intimate countercurrent contact relationship with carbonated liquor to absorb the sulphur dioxide gases therein and form the cooking liquor. The gases leaving the sulphiting tower are divided with a portion thereof passed through carbonating towers where the green liquor from the incinerating and dissolving or leaching steps is contacted with the sulphur dioxide free combustion gases to convert the green liquor to a carbonated form and release hydrogen sulphide to the contacting gas stream. The effluent gases from the carbonation step are divided with a portion containing hydrogen sulphide returned to the incinerating furnace for oxidation to sulphur dioxide which is used, along with the sulphur dioxide formed during the incineration of the liquor, to sulphite the liquor. The remaining portion of effluent gas is exhausted to the atmosphere in a hydrogen sulphide free condition.

In commercial operations of the system described, it was found that a more effective method for essentially converting all the sodium sulphide in the green liquor, to sodium carbonate and/or sodium bicarbonate with the release of sulphur as hydrogen sulphide was possible by incorporating a separate precarbonation step into the process. In the original process described in U.S. Patent 2,788,273, precarbonation was accomplished by reacting part of the carbonating system gas containing a high concentration of hydrogen sulphide with the sodium sulphide in the green liquor in accordance with the formula $$Na_2S + H_2S \rightarrow 2NaHS$$

In the modified precarbonation step, the sodium sulphide in the green liquor is converted to sodium hydrosulphide in accordance with the formula $$2Na_2S + CO_2 + H_2O \rightarrow 2NaHS + Na_2CO_3$$

This process modification decreased the total amount of sulphur which was required to be released in the subsequent carbonation step of the process or lowered the sulphur level of sodium hydrosulphide in the carbonated liquor leaving the carbonation system. Thus, the proportionate amount of sulphur released as hydrogen sulphide in the stack gases from the process was materially reduced, with consequent benefit to the overall economics of the process and substantial improvements in the air pollution situation.

It has also been found, contrary to expectations, that it is possible to carbonate the precarbonated green liquor by direct intimate contact with flue gases containing both carbon dioxide and sulphur dioxide. It has previously been considered undesirable to use sulphur dioxide containing gases for carbonation purposes since it was thought the presence of sulphur dioxide in the carbonating gases would result in an excessive conversion of sodium hydrosulphide and/or sodium carbonate to sodium thiosulphate, thereby making the sodium-sulphur compounds unavilable for conversion to cooking agents.

In accordance with the present invention, the carbon dioxide and sulphur dioxide containing flue gases leaving the residual liquor concentrator are divided, with some of the gases passing directly to the sulphiting tower while the remainder is directed first through the presulphiting tower and then through the carbonating towers of the system. This procedure substantially eliminates the release of hydrogen sulphide during the sulphiting step of the process and its subsequent release to the atmosphere, and reduces the formation of sodium thiosulphate in the sulphiting step. The elimination or reduction in the release of hydrogen sulphide to the atmosphere becomes possible since by the substantial elimination of sodium hydrosulphide in the presulphiting stage of the process practically none of the sodium hydrosulphide is delivered to the sulphiting stage. It will be recognized that the sodium hydrosulphide present in the green liquor delivered to the carbonation and sulphiting steps of the process will react when contacted by sulphur dioxide containing gases to form hydrogen sulphide, in accordance with the formula $$2NaHS + SO_2 + H_2O \rightarrow Na_2SO_3 + 2H_2S$$

Similarly the reaction using carbon dioxide can also occur according to the formula $$2NaHS + CO_2 + H_2O \rightarrow Na_2CO_3 + 2H_2S$$

According to the above reactions, the sodium hydrosulphide produces hydrogen sulphide. It also may convert sodium carbonate to sodium thiosulphate according to the following formula $$2Na_2CO_3 + 4SO_2 + 2NaHS \rightarrow 3Na_2S_2O_3 + 2CO_2 + H_2O$$

Advantageously, in the presulphiting step of the present invention, the sodium hydrosulphide is substantially completely eliminated, with a majority of the carbon dioxide and sulphur dioxide reactions resulting in hydrogen sulphide, while only a very minor portion of the reactions result in the formation of sodium thiosulphate. This is entirely due to the higher pH (8.5 to 10) of the solution in the presulphiting step. When the presulphiting step is omitted the pH values in the sulphiting step are lower (in the neighborhood of 7 to 8.5) and a major portion of the sodium hydrosulphide is converted to sodium thiosulphate. Moreover, at least some of the sodium carbonate is also converted to sodium thiosulphate, with only a minor portion of the reaction resulting in the formation of hydrogen sulphide. According to the present invention, the hydrogen sulphide formed in the presulphiting tower from the sodium hydrosulphide reaction is passed through the carbonating towers and returned to the incinerating furnace for oxidation to sulphur dioxide, while substantially no hydrogen sulphide is released from the sulphiting tower to the atmosphere.

In addition to limiting pH conditions of 8.5 to 10.0 which are required for successful presulphiting, it is important that the contact between liquid and gases which contain carbon dioxide and sulphur dioxide be accomplished with a minimum contact time and still promote the removal of hydrogen sulphide from the liquid phase. This can be accomplished by equipment of the venturi type or the like.

In order to compensate for out-of-phase operation between the carbonation, presulphiting, and sulphiting steps additional sulphur dioxide gas may be required. This is accomplished by supplying sulphur dioxide from an external source, such as a sulphur burner, to the carbon dioxide and sulphur dioxide containing flue gas prior to the presulphiting step. The quantity of sulphur dioxide required and supplied from this source can be regulated automatically or manually through the use of pH control of the liquor leaving the presulphiting step. For best results, the total concentration of sulphur dioxide in the gas entering the presulphiting step should not exceed more than 10 percent on a volumetric dry basis.

The various features of novelty which characterize our invention are pointed out with particularity in the claims annexed to and forming a part of this specification. For a better understanding of the invention, its operating advantages and specific objects attained by its use, reference should be had to the accompanying drawings and descriptive matter in which we have illustrated and described a preferred embodiment of the invention.

The single sheet of drawings diagrammatically illustrates an arrangement of apparatus for performing the process of the present invention.

As shown in the drawing, partially concentrated residual liquor obtained from the digestion process of wood chip pulping is pumped at superatmospheric pressure through a pipe 10 to a venturi scrubber 11. The partially concentrated liquor is sprayed by nozzles 12 into the throat 13 of the venturi scrubber to intimately contact the hot combustion or flue gases leaving a furnace 14 wherein concentrated liquor is being incinerated. The intimate contact between the liquor and the hot gases evaporates moisture from the liquor as it moves through duct 15 to a cyclone separator 16, to the end that the solids concentration of the liquor collected in the hopper bottom 17 of the cyclone separator will be sufficient to permit the liquor to be burned under self-sustaining combustion conditions in the furnace 14. A portion of the concentrated liquor collected in hopper bottom 17 is recirculated through pipe 18 to nozzles 20 upstream of the nozzles 12 to increase the efficiency of solids removal from the flue gases exiting from the furnace 14.

The furnace 14 disclosed in the drawing is of the general type shown in U.S. Patent 2,879,838. As shown, and described in said patent, the residual liquor is introduced into the furnace by a spray nozzle 21 and reduced on the hearth 22 of the furnace where the heat of combustion of the organic matter therein forms a smelt of the inorganic chemicals. The smelt is discharged through a spout 23 at the lower end portion of the hearth 22 and is delivered to a leaching or dissolving tank 24 where the smelt is dissolved in water to form green liquor. The green liquor, primarily composed of sodium carbonate, sodium sulphide and sodium sulphate, with a minor percentage of sodium hydrosulphide, is passed from the dissolving tank through a clarifier 25 for the removal of insoluble dregs and delivered to a green liquor storage tank 26. As shown, the dregs from the clarifier may be water washed, with the dregs discharged to the sewer while the weak wash water is delivered to the dissolving tank 24 for liquid makeup.

The gaseous products of combustion rising through the furnace 14 may be contacted by additional combustion air and/or other gases to complete the combustion of the combustibles in the gases and to control the temperature of the gases entering the venturi 11, and are thereafter passed through the venturi and cyclone separator 16 previously described. As hereinafter described, hydrogen sulphide containing gases are introduced into the upper portion of the furnace 14 through a nozzle 27, where hydrogen sulphide is oxidized to sulphur dioxide. The gases of combustion leaving the furnace 14 thus will contain carbon dioxide and sulphur dioxide, in addition to suspended solids entrained in the gases.

The venturi scrubber 11, with its cyclone separator 16, effectively removes the entrained solid matter in the gases and concentrates the liquor so that the cooled gases entering the inlet of an induced draft fan 28 contain carbon dioxide, sulphur dioxide and water vapor for subsequent reaction in the recovery process.

As shown in the drawing, the gases discharged from the fan 28 are divided for flow with one portion passing through a duct 30 to a sulphiting tower 31. Another portion of the gases passed through a duct 32 to a gas-liquid contacting device here shown as a venturi 33, thence to tower 34 which serves as a liquid-gas separating device. Additional enriching sulphur dioxide gases can be added to the gas in duct 32 through duct 29. Such gases can originate in a separate sulphur burner or other sulphur dioxide source. Tower 34 also serves as one of the carbonation towers in the system.

The sulphiting tower 31 is provided with a suitable packing, such as Raschig rings, for effective contact between liquid and gases passing through the tower. The sulphur dioxide containing gases in duct 30 are introduced into an intermediate portion of the tower, with the gases discharging from a centrally positioned upper outlet 35 which is connected by a hood 36 to the stack 37 for discharge of gases to the atmosphere. Presulphited carbonated liquor is introduced into the tower 31 from a liquor storage tank 38 by means of the connecting piping 40. The pipe 40 delivers the liquor to the lower portion of the tower 31 where it is combined with other liquor passed downwardly in countercurrent relationship with the flue gases. The liquor mixture is withdrawn from the tower through a pipe 41 by a pump 42, with the pump discharge divided to pass a portion of the sulphited liquor to cooking liquor storage (not shown) through pipe 43 and the remainder through pipe 44 into the upper portion of the tower 31 for passage downwardly therethrough.

Some of the carbon dioxide containing gases leaving the sulphiting tower 31 are passed by a fan 46 through a valved conduit 45 to and through a precarbonation tower 47, returning through conduit 48 to the stack 37. The remainder of the gases are discharged directly through stack 37 to the atmosphere.

The precarbonation tower 47 is suitably packed with, for example, Raschig rings or the like to effect contact between the green liquor, from tank 26, which is gravitationally passed downwardly through the tower and the ascending stream of carbon dioxide containing flue gases.

It is important to so regulate the flow rate of gases through the conduit 45 to the precarbonation tower 47 to avoid release of hydrogen sulphide from the tower and through duct 48 to the stack 37 and to the atmosphere. This is accomplished by a regulating valve or damper 50 in the duct 45 leading to the fan 46 adjustment of which is in accordance with the presence or absence of hydrogen sulphide in the gases leaving the precarbonation tower 47. A hydrogen sulphide detector may be used to control the position of the damper 50 so that the presence of hydrogen sulphide in the gas passing through the duct 48 would tend to reduce the flow of gases to the tower until the detector indicated there was no hydrogen sulphide present. It is, of course, desirable to pass as large a quantity of carbon dioxide gas to the tower 47 as possible so as to obtain the highest possible precarbonation of the sodium sulphide in the liquor, without forming hydrogen sulphide. The pipes 51 and 53 and pumps 52 discharge the precarbonated liquor into a carbonation tower 54 for further carbonation of the liquor.

The partially carbonated liquid discharged from the bottom of the precarbonation tower 47, which includes a mixture of sodium carbonate and sodium hydrosulphide, is pumped to the upper portion of the carbonation tower 54 for gravitational movement therethrough and is thereafter passed in series through each of the towers 55 and 56 and 34 by the transfer pipes 57, 58, 60 respectively. The liquor leaving tower 34 is recirculated by pumping to the venturi 33 through line 63. Liquor is withdrawn from line 63 through line 64 and delivered to surge tank 38.

The gases entering the tower 56 from the tower 34 pass in countercurrent relationship to the downwardly flowing liquor, and thereafter pass in series through each of the carbonation towers 55 and 54. The contact between the carbon dioxide containing gases and the precarbonated liquor releases large quantities of hydrogen sulphide which is withdrawn from the tower 54 by means of a fan 61 and passed through a conduit 62 for discharge through nozzle 27 into the furnace 14. The hydrogen sulphide gases are burned in the furnace to convert the sulphur therein to sulphur dioxide, which will be utilized in the sulphiting and presulphiting towers 31 and venturi 33.

It will be appreciated the above described process of sulphiting liquor in successive stages with pH control is effective in reducing the formation of thiosulphate, particularly when the hydrogen sulphide is stripped substantially as it is formed. This can be accomplished advantageously in a contact device such as shown at 33. It will further be understood sulphiting can be accomplished in a process such as the one described, whether the dissolved smelt has been carbonated or not.

While in accordance with the provisions of the statutes we have illustrated and described herein the best form and mode of operation of the invention now known to us, those skilled in the art will understand that changes may be made in the form of the apparatus disclosed without departing from the spirit of the invention covered by our claims, and that certain features of our invention may sometimes be used to advantage without a corresponding use of other features.

What is claimed is:

1. In a chemical process wherein a residual pulp liquor containing carbonated sodium-sulphur compounds is converted to a liquor containing sodium salts of sulphurous acid the steps comprising, passing said carbonated liquor through a presulphiting zone in direct contact with gases containing $CO_2$ and $SO_2$ to partially sulphite said carbonated liquor, maintaining the liquor in said presulphiting zone at a pH of 8.5 to 10 to substantially eliminate NaHS, and thereafter passing said partially sulphited liquor through a sulphiting zone in direct contact with a separate stream of said gases containing $CO_2$ and $SO_2$ to form liquor containing sodium salts of sulphurous acid.

2. In a chemical process wherein a residual pulp liquor containing sodium sulphide is converted to a liquor containing sodium salts of sulphurous acid the steps comprising, passing the liquor through a carbonation zone in countercurrent contact with gases containing $CO_2$ with the formation of $H_2S$, withdrawing the gases including $H_2S$ from said carbonation zone, passing said carbonated liquor through a presulphiting zone in direct contact with gases containing $CO_2$ and $SO_2$ to partially sulphite said carbonated liquor, releasing $H_2S$ and substantially eliminating NaHS, passing the gases from said presulphiting zone including the released $H_2S$ through said carbonation zone, and passing said partially sulphited liquor through a sulphiting zone in direct contact with a separate stream of said gases containing $CO_2$ and $SO_2$ to form liquor containing sodium salts of sulphurous acid.

3. In a chemical process wherein a residual pulp liquor containing sodium sulphide is converted to a liquor containing sodium salts of sulphurous acid the steps comprising contacting said sodium sulphide liquor with a $CO_2$ containing gas to precarbonate said liquor, passing the precarbonated liquor through a carbonation zone in countercurrent contact with gases containing $CO_2$ with the formation of $H_2S$, withdrawing the gases including $H_2S$ from said carbonation zone, passing said carbonated liquor containing NaHS through a presulphiting zone in direct contact with gases containing $CO_2$ and $SO_2$ to partially sulphite said carbonated liquor and to substantially eliminate NaHS, and passing said partially sulphited liquor substantially free of NaHS through a sulphiting zone in direct contact with a separate stream of said gases containing $CO_2$ and $SO_2$ to form liquor containing sodium salts of sulphurous acid at a pH of 7 to 8.5 and releasing the gases to the atmosphere substantially free of $H_2S$.

4. In a chemical process wherein a residual pulp liquor containing sodium sulphide is converted to a liquor containing sodium salts of sulphurous acid the steps comprising contacting said sodium sulphide liquor with a $CO_2$ containing gas to precarbonate said liquor, passing the precarbonated liquor through a carbonation zone in countercurrent contact with gases containing $CO_2$ with the formation of NaHS and $H_2S$, withdrawing the gases including $H_2S$ from said carbonation zone, passing said carbonated liquor containing NaHS through a presulphiting zone in direct contact with gases containing $CO_2$ and $SO_2$ to partially sulphite said carbonated liquor and to substantially eliminate the NaHS, maintaining the liquor in said presulphitng zone at a pH of 8.5 to 10 to avoid the formation of thiosulphate, and passing said partially sulphited liquor through a sulphiting zone in direct contact with a separate stream of said gases containing $CO_2$ and $SO_2$ to form liquor containing sodium salts of sulphurous acid at a pH of 7 to 8.5.

References Cited in the file of this patent

UNITED STATES PATENTS

| | | |
|---|---|---|
| 2,320,294 | Palmrose | Mar. 25, 1943 |
| 2,789,883 | Cook | Apr. 23, 1957 |

UNITED STATES PATENT OFFICE
CERTIFICATE OF CORRECTION

Patent No. 3,153,609                                            October 20, 1964

Henry P. Markant et al.

It is hereby certified that error appears in the above numbered patent requiring correction and that the said Letters Patent should read as corrected below.

Column 2, line 60, in the formula, for "$SO_2$", second occurence, read -- $SO_3$ --; line 64, in the formula, for "$CO_2$", second occurrence, read -- $CO_3$ --.

Signed and sealed this 12th day of April 1966.

(SEAL)
Attest:

ERNEST W. SWIDER                                                  EDWARD J. BRENNER
Attesting Officer                                                        Commissioner of Patents